United States Patent [19]

Turner

[11] 4,157,795
[45] Jun. 12, 1979

[54] FISHING REEL

[76] Inventor: Lenord H. Turner, 387 N. 3rd St., Cocoa Beach, Fla. 32931

[21] Appl. No.: 854,820

[22] Filed: Nov. 25, 1977

[51] Int. Cl.² ............................................. A01K 89/02
[52] U.S. Cl. ............................... 242/84.5 R; 308/238; 308/DIG. 9
[58] Field of Search ...................... 242/84.1 R, 84.5 R, 242/84.51 R, 84.5 A, 84.51 A; 308/DIG. 9, DIG. 8, DIG. 7, 238, 240

[56] References Cited
U.S. PATENT DOCUMENTS 2,986,355  5/1961  Sarah ............................... 242/84.5 R
4,011,774  3/1977  Moosberg ........................ 242/84.1 R Primary Examiner—Billy S. Taylor
Attorney, Agent, or Firm—Duckworth, Hobby, Allen & Pettis

[57] ABSTRACT

A fishing reel apparatus having a line spool and spool shaft mounted on a casing and having one or more bearings supporting the spool to the casing. Improvements in the bearings and spool brake include a bearing having a polymer bushing encased in metal except for a small protruding portion which sets against a ledge on the spool shaft and a brake member made of a solid lubricant polymer and working with the bearing to vary the tension on the line spool.

6 Claims, 6 Drawing Figures

FISHING REEL

BACKGROUND OF THE INVENTION

The present invention relates to fishing reels and especially to improvements in fishing reels involving the bearings and spool tension brake of the line spool.

In the past, a great variety of fishing reels have been provided which are frequently divided into casting reels, spinning reels, and fly casting reels, and into combinations such as spincasting reels.

Casting reels of the type of the present invention are made of high quality components and frequently include stainless steel ball bearings to support the line reels as well as brass or bronze discs for applying pressure to the line reel to adjust the tension on the reel. It has been suggested in other fields to utilize various types of polymer bearings where heat and pressure will allow, but in fishing reels, the continuous pressure on a polymer bearing forces the bearing to distort the material to flow, thereby interfering with the action of the reel. The present invention is directed towards an improved fishing reel which has an improved solid lubricant polymer bearing designed to prevent the polymer from flowing out of shape and changing the action of the reel in combination with a polymer braking member, both of which are not affected by salt water in salt water fishing reels, and tend to prevent damage to reels, bearing, and brakes by small pieces of grit that might work their way into the reel.

SUMMARY OF THE INVENTION

A fishing reel apparatus utilizes a conventional reel having a line spool mounted to a casing and having at least one protruding shaft therefrom. Bearings are mounted on the shaft and support the line spool to a casing with each bearing having a cylindrical solid lubricant polymer bushing member having an aperture therethrough encased in a pair of metal casings attached thereover, with an aperture in each metal casing larger than the aperture through the polymer bushing, whereby a small portion of the lubricant bushing can protrude into the aperture of the metal casings. A solid polymer line spool tension member works in conjunction with the polymer bushing for varying the spool tension of the spool line to the fishing reel. The process of making a fishing reel line supporting bearing and brake is also provided having the steps of making a first cylindrical cup shaped metal casing member having an aperture therethrough, then making a second cylindrical cup shaped metal casing member having an aperture therethrough and being larger than the first metal casing member, making a solid lubricant polymer bushing having a cylindrical shape and a small aperture therethrough, smaller than the aperture in said first and second metal casings, then inserting the solid polymer into said first metal casing and inserting said first metal casing into said second metal casing and attaching said metal casings together with sufficient force to force the flow of some solid lubricant polymer through a portion of the aperture of said first and second metal casings. dr

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
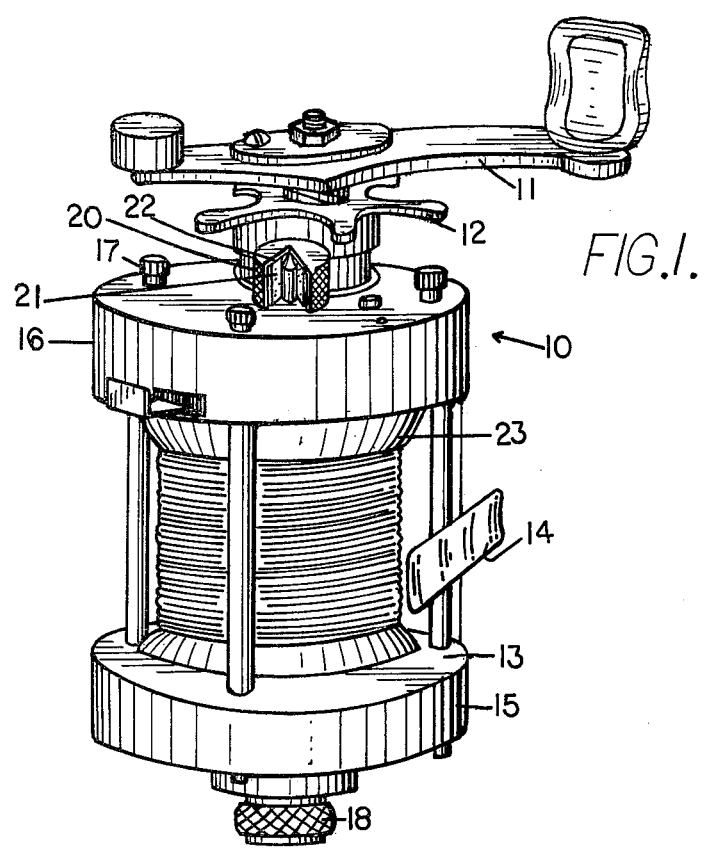
FIG. 1 is a perspective view of a fishing reel in accordance with the present invention having a cutaway of the spool braking nut and spool cap.
Figure 2:
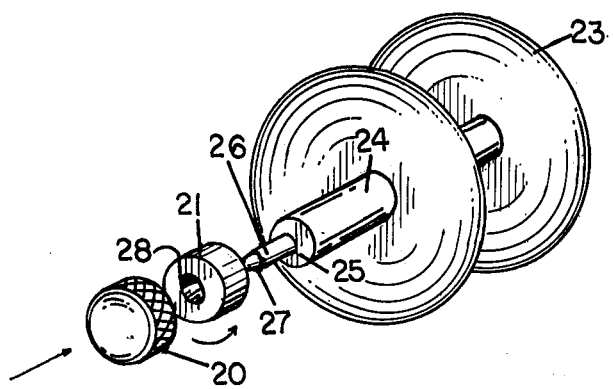
FIG. 2 is an exploded perspective view of the line spool of the reel of FIG. 1 the bearing and the spool cap.

Referring now to FIG. 1 of the drawing, a fishing reel 10 is illustrated having a handle assembly 11, a star drag member 12, which are attached to a frame assembly 13 having a rod connecting bracket 14 attached thereto. The reel 10 has a left side cover assembly 15 and a right side cover assembly 16, having a plurality of nuts 17 for attaching the cover assembly 16 to the frame 13. The cover assembly 15 has a left spool cap 18 and a right spool cap 20 attached thereto. The spool cap 20 has the bearing 21 and a spool tensioning disc 22 therein. The reel has a spool 23 mounted in the frame 13 and supported by a pair of bearings 21, which ride on a shaft 24, as illustrated in FIG. 2, which shaft has a ledge 25 and a tapered bearing support portion 26 thereon. The bearing 21 rides on the tapered bearing support shaft 26, while the tip 27 of the tapered shaft portion 26 protrudes through the bearing aperture 28 where it presses against the disc 22 of FIG. 1. The spool cap 20 supports both the spool tensioning disc 22 and bearing 21 on a tapered shaft portion 26 in a manner so that the bearing 21 can be forced against the ledge 25 and the tip 27 can be forced against the spool tensioning disc 22 in the cap 20.

Figure 3:
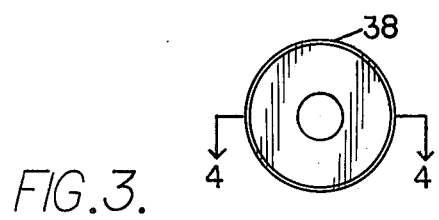
FIG. 3 is a top elevation of the bearing of FIG. 2.
Figure 4:
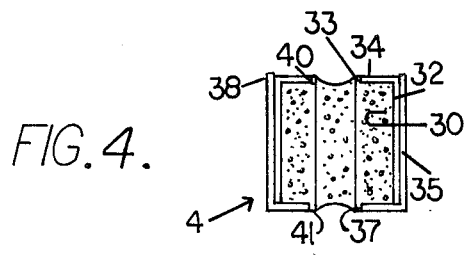
FIG. 4 is a sectional view taken on line 4—4 of FIG. 3.
Figure 6:
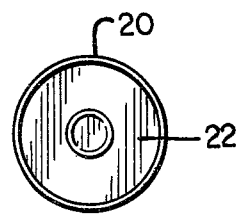
FIG. 6 is a ball bearing retainer and spool tension brake disc.
Figure 5:
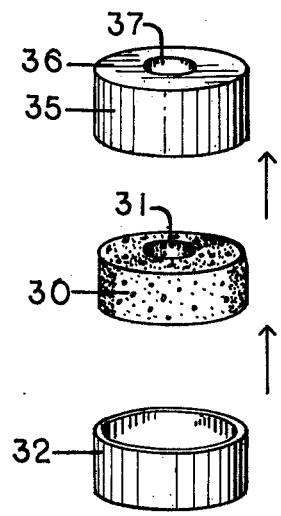
FIG. 5 is an exploded view of the bearing of FIGS. 3 and 4.

The bearing is more clearly illustrated in FIGS. 3, 4, and 5, in which the bearing has a center cylindrical bushing member 30 formed of a cylindrical aperture 31 therein and made of a solid polymer lubricant such as polytetraflouroethylene, which can be inserted into a metal casing member 32, which is cylindrical and formed into a cup shape with an aperture 33 therethrough, and having a diameter to exactly receive the bushing 30 thereinto and abut against the end portion 34 having the aperture 33 therethrough so as to align the aperture 31 and 33 with the aperture 33 being smaller than the aperture 31. The second casing 35 is a cylindrically shaped cup member having one end wall 36 having an aperture 37 which may be the same diameter as the aperture 33 and larger than the aperture 31 of the bushing 30. The diameter of the casing 35 is made to slide the metal casing 33 into, either with a pressed fit or with a rolled edge 38. The metal casings 32 and 35 are applied under pressure so that the bushing portion 30 protrudes in a small lip 40 and 41 protruding through apertures 33 and 37 respectively. The metal casing allows the polymer lubricant 30 to be held therein without flowing to a different shape under pressure in use from the cylindrical surface or from either end, and at the same time allows a small amount of polymer to protrude through the opening of the metal casing apertures, which can then press against the ledge 25 of FIG. 2. Since the shaft 26 is tapered, the bearing 21 will push against the ledge 25, and as the cap 20 is tightened down, will tighten the lip 40 of the bearing 21 tighter against the ledge 25, thereby adjusting the tension that the spool is under during rotation, yet at the same time having a solid lubricant to prevent wear and to allow a smooth tensioning of the spool. In addition, the tip 27 of the tapered shaft portion 26 pushes against the solid lubricant polymer disc 22 as seen in FIG. 6 to allow the same smooth action. The disc 22 may be circular and can be made of polytetraflouroethylene of the same type as used in bushing 30. The combination of these improvements greatly increases the casting ability of the user, and reduces backlashes by the smooth braking action.

The method of making the bearing 21 is illustrated in FIGS. 4 and 5, which includes the step of making a first cylindrical metal cup 32 having an aperture therein, inserting a cylindrical solid lubricant bushing 30 into the metal cup 32 and having an aperture 31 therein, then making a second cylindrical cup 35 having an inside diameter equal to the outside diameter of the metal cup 32 and inserting the metal cup 32 of the bushing 30 thereinto with a press fit under pressure, and rolling, if desired, the edge 38 thereover to squeeze the polymer lips 40 and 41 into the apertures 37 and 33.

It should be clear at this point that an improved reel, spool, bearing, and tensioning system and method for making the spool bearing have been provided, but it should also be realized that other embodiments are contemplated as being within the scope of the invention, and that the bearing and tensioning or brake portion of the reel can be easily utilized in spinning reels or other types of reels as desired, without departing from the spirit and scope of the invention. In addition, the metal casings of the bearings 35 and 32 may be made of an aluminum, but can also be of a stainless steel or other metal if desired, while the polymer lubricant bushing 30 can be made of any polymer lubricant material having sufficient strength without departing from the scope of the invention. Accordingly, the present invention is not to be construed as limited to the particular forms disclosed herein, which are to be considered illustrative rather than restrictive.

I claim:

1. A fishing reel, comprising in combination:
a casing;
a line spool mounted to said casing and having at least one shaft protruding therefrom, said shaft having a ledge formed thereon;
a pair of bearings being positioned on said shaft on said line spool and supporting said spool in said casing;
each said bearing having a cylindrical solid lubricant polymer bushing having an aperture therethrough encased in a metal casing having an aperture therethrough, said polymer bushing having an aperture smaller than said metal casing aperture; and
line spool tension means including a solid polymer spool tension member for varying the spool tension of said spool in said casing by changing the pressure applied to said solid polymer line spool tension member.

2. The apparatus in accordance with claim 1, in which said solid polymer line spool tension member includes a polymer lip extending from said polymer bushing through the aperture in said metal casing to press against the ledge on said line spool protruding shaft.

3. The apparatus in accordance with claim, 2, in which each said bearing has a pair of cylindrical cup shaped metal casings having apertures therein, one having an outside diameter to fill the inside diameter of the other, whereby the two metal casings can be attached together to encase the solid polymer lubricant.

4. The apparatus in accordance with claim 3, in which the solid polymer lubricant is polytetraflouroethylene.

5. The apparatus in accordance with claim 4, in which said pair of metal casings has said solid polymer lubricant mounted therein, and compressed to force a lip of polymer material through the aperture in said metal casing.

6. The apparatus in accordance with claim 5, in which said larger metal casing has an edge portion rolled over said smaller metal casing to hold said metal casings together.

* * * * *